United States Patent
Lairsey et al.

(10) Patent No.: US 10,972,361 B2
(45) Date of Patent: Apr. 6, 2021

(54) SYSTEM AND METHOD FOR REMOTE HARDWARE SUPPORT USING AUGMENTED REALITY AND AVAILABLE SENSOR DATA

(71) Applicant: DELL PRODUCTS, LP, Round Rock, TX (US)

(72) Inventors: Jeffrey M. Lairsey, Round Rock, TX (US); Sudhir Vittal Shetty, Cedar Park, TX (US); Alexander P. Rote, Pflugerville, TX (US); Saurabh Kishore, Round Rock, TX (US); Robert V. Cox, Austin, TX (US); Saurav Shrestha, Round Rock, TX (US); Robert Barrett, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 31 days.

(21) Appl. No.: 16/264,501

(22) Filed: Jan. 31, 2019

(65) Prior Publication Data
US 2020/0252302 A1    Aug. 6, 2020

(51) Int. Cl.
*G06F 3/0484* (2013.01)
*H04L 12/24* (2006.01)
(Continued)

(52) U.S. Cl.
CPC ............ *H04L 41/22* (2013.01); *G06F 3/0484* (2013.01); *G06K 9/00671* (2013.01); *H04W 76/10* (2018.02)

(58) Field of Classification Search
CPC ... G06K 9/00671; H04W 76/10; H04L 41/22; H04L 43/50; G06T 19/006;
(Continued)

(56) References Cited

U.S. PATENT DOCUMENTS 8,793,587 B2    7/2014  Sayers
8,913,086 B2 *  12/2014 Meserth ................. G06F 11/07
                                                              345/633
(Continued)

OTHER PUBLICATIONS

PCT/US20/12253, International Search Report dated Apr. 9, 2020, 14 pages.

*Primary Examiner* — Steven P Sax
(74) *Attorney, Agent, or Firm* — Larson Newman, LLP (57) ABSTRACT

An information handling system for managing equipment in a datacenter includes a display, a wireless communication interface, and an imaging system configured to capture image data from within a field of view of the imaging system. The information handling system shows the image data on the display, and provides an augmented reality overlay on the display over the image data. The augmented reality overlay locates an element of datacenter equipment that needs to be serviced. The information handling system further determines that the element is within the field of view, establishes a wireless communication link with the element via the wireless communication interface in response to determining that the element is within the field of view, and receives an instruction to service the element from a remote service system in response to establishing the wireless communication link.

20 Claims, 7 Drawing Sheets

(51) Int. Cl.
*H04W 76/10* (2018.01)
*G06K 9/00* (2006.01)

(58) Field of Classification Search
CPC ........... G06T 2219/004; G06F 11/0709; G06F 11/32; G06F 3/011; G06F 2111/18; G06F 3/0484; G06F 3/0482; G06Q 10/06; G06Q 10/103; G06Q 10/20; G01C 21/206; G05B 2219/32014
See application file for complete search history.

(56) References Cited

U.S. PATENT DOCUMENTS

| | | | |
|---|---|---|---|
| 8,957,917 | B2 | 2/2015 | Meserth et al. |
| 10,360,735 | B1* | 7/2019 | Reeder ................. G06Q 30/016 |
| 2003/0179218 | A1 | 9/2003 | Martins et al. |
| 2004/0105573 | A1 | 6/2004 | Neumann et al. |
| 2005/0001852 | A1 | 1/2005 | Dengler et al. |
| 2006/0189854 | A1 | 8/2006 | Webb et al. |
| 2007/0005382 | A1 | 1/2007 | Sayers |
| 2009/0167787 | A1 | 7/2009 | Bathiche et al. |
| 2010/0087981 | A1* | 4/2010 | Orozco-Perez ......... H04L 67/18 |
| | | | 701/29.5 |
| 2011/0239056 | A1 | 9/2011 | Adams |
| 2012/0249588 | A1 | 10/2012 | Tison et al. |
| 2012/0259973 | A1 | 10/2012 | Windell |
| 2013/0031202 | A1 | 1/2013 | Mick et al. |
| 2013/0083063 | A1* | 4/2013 | Geisner .................. G06F 3/013 |
| | | | 345/633 |
| 2013/0271625 | A1 | 10/2013 | Gruber et al. |
| 2013/0295952 | A1* | 11/2013 | Chao ..................... G01S 5/0236 |
| | | | 455/456.1 |
| 2014/0123299 | A1* | 5/2014 | Jung ....................... G06F 21/74 |
| | | | 726/26 |
| 2014/0146038 | A1 | 5/2014 | Kangas et al. |
| 2015/0363647 | A1* | 12/2015 | Perez ..................... G06F 3/011 |
| | | | 345/633 |
| 2016/0071319 | A1 | 3/2016 | Fallon et al. |
| 2016/0176724 | A1* | 6/2016 | Ji ......................... G06T 19/006 |
| | | | 700/282 |
| 2016/0203369 | A1 | 7/2016 | Inutsuka |
| 2016/0217617 | A1* | 7/2016 | Barribeau ........... G06F 3/04883 |
| 2016/0234202 | A1 | 8/2016 | Ahmed et al. |
| 2016/0253563 | A1* | 9/2016 | Lam ..................... G06F 11/0748 |
| | | | 348/130 |
| 2016/0350595 | A1* | 12/2016 | Solomin ............... G06K 9/6263 |
| 2017/0011254 | A1 | 1/2017 | Guo et al. |
| 2017/0322705 | A1* | 11/2017 | Conway ................. G06Q 40/08 |
| 2018/0077200 | A1 | 3/2018 | Apvrille |
| 2018/0130260 | A1* | 5/2018 | Schmirler .......... G06Q 10/0633 |
| 2018/0330338 | A1* | 11/2018 | Holden ................... G06F 11/30 |
| 2018/0350144 | A1* | 12/2018 | Rathod ............... G06Q 20/3276 |
| 2019/0012857 | A1* | 1/2019 | Noonan ................. H04W 4/33 |
| 2019/0041637 | A1* | 2/2019 | German ................. G01S 19/01 |
| 2019/0052638 | A1* | 2/2019 | Agarwal ............. G06T 19/006 |
| 2019/0149725 | A1 | 5/2019 | Adato et al. |
| 2019/0174252 | A1 | 6/2019 | Crane et al. |
| 2019/0175070 | A1* | 6/2019 | Decker ................. A61B 5/1074 |
| 2019/0244425 | A1* | 8/2019 | Koohmarey ........... H04W 4/02 |
| 2019/0254102 | A1 | 8/2019 | Teyeb et al. |
| 2019/0362641 | A1* | 11/2019 | Sukhwani .............. G09B 5/065 |
| 2020/0061811 | A1 | 2/2020 | Iqbal et al. |
| 2020/0074831 | A1 | 3/2020 | Yun et al. |
| 2020/0110560 | A1* | 4/2020 | Hariton ................. G06F 3/1206 |
| 2020/0162851 | A1* | 5/2020 | Wilde ................ H04B 10/1149 |

* cited by examiner

SYSTEM AND METHOD FOR REMOTE HARDWARE SUPPORT USING AUGMENTED REALITY AND AVAILABLE SENSOR DATA

CROSS REFERENCE TO RELATED APPLICATIONS

Related subject matter is contained in co-pending U.S. patent application Ser. No. 16/264,372 entitled "System and Method for Hardware Management and Configuration in a Datacenter Using Augmented Reality and Available Sensor Data," filed Jan. 31, 2019, the disclosure of which is hereby incorporated by reference.

FIELD OF THE DISCLOSURE

This disclosure generally relates to information handling systems, and more particularly relates to remote hardware support in a datacenter using augmented reality and available sensor data.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system for managing equipment in a datacenter may include a display, a wireless communication interface, and an imaging system configured to capture image data from within a field of view of the imaging system. The information handling system may show the image data on the display, and provide an augmented reality overlay on the display over the image data. The augmented reality overlay may locate an element of datacenter equipment that needs to be serviced. The information handling system may further determine that the element is within the field of view, establish a wireless communication link with the element via the wireless communication interface in response to determining that the element is within the field of view, and receive an instruction to service the element from a remote service system in response to establishing the wireless communication link BRIEF DESCRIPTION OF THE DRAWINGS It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
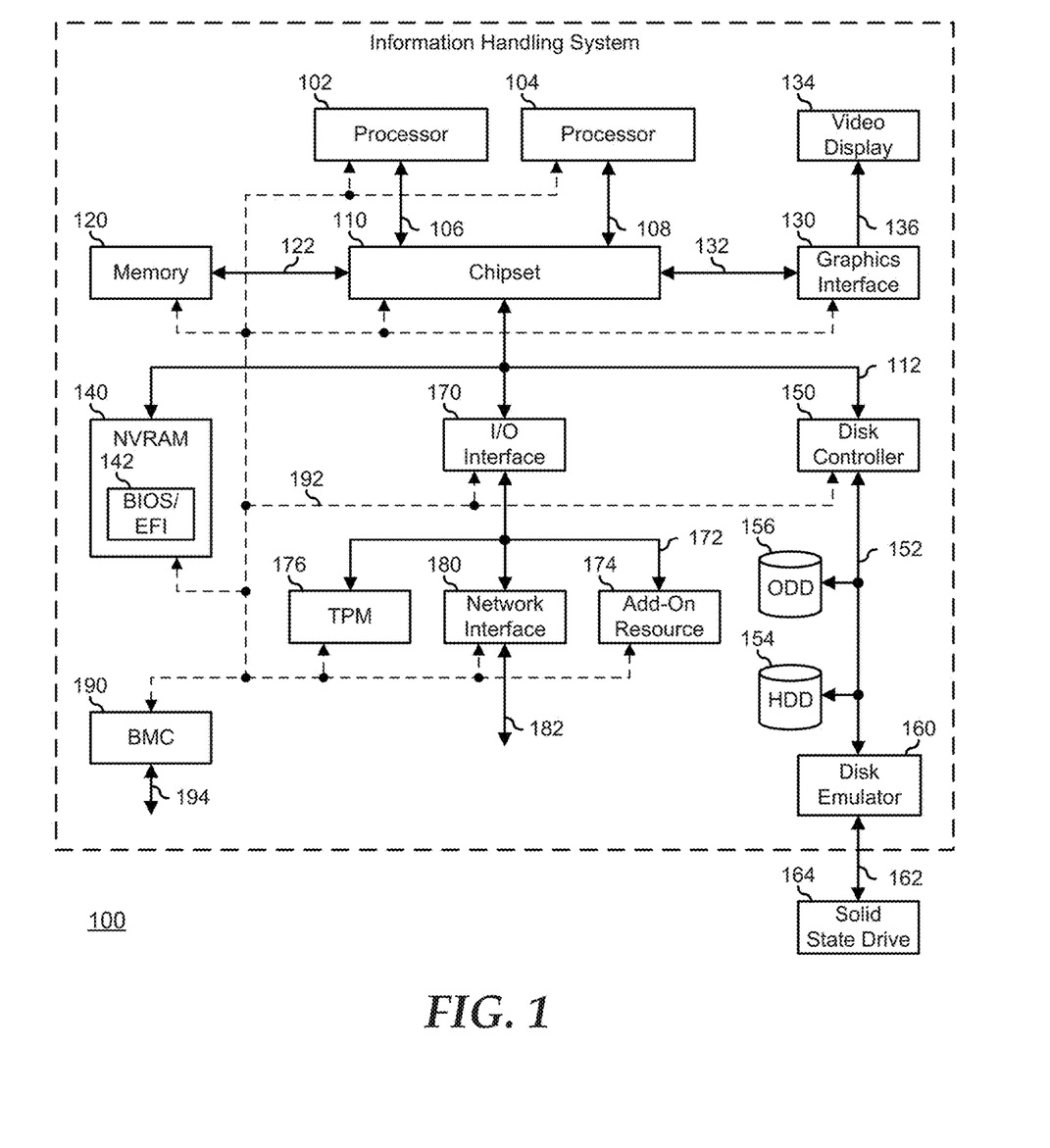
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a BLUETOOTH or BLUETOOTH-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof. BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image. BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, the information handling system may represent one of many hundreds or thousands of other enterprise class processing systems in the datacenter. In such an environment, the information handling system may represent one of a wide variety of different types of information handling systems that perform the main processing tasks of the datacenter, such as computing equipment (servers, modular blade systems, and the like), switching and routing equipment (network routers, top-of-rack switches, and the like), data storage equipment (storage servers, network attached storage, storage area networks, and the like), or other equipment which the datacenter uses to perform the processing tasks. Further, the information handling system may represent management equipment that is networked to the processing equipment via a separate management network, and that operates to monitor, manage, and maintain the processing equipment. Finally, the information handling system may represent datacenter service equipment that is utilized by datacenter technicians of the datacenter to perform monitoring, management, service, and maintenance of the processing and management equipment of the data center. Such datacenter service equipment would historically include an information handling system on a "crash cart," but increasingly includes mobile devices such as tablet computing devices, smart phone devices, and the like.

Figure 2:
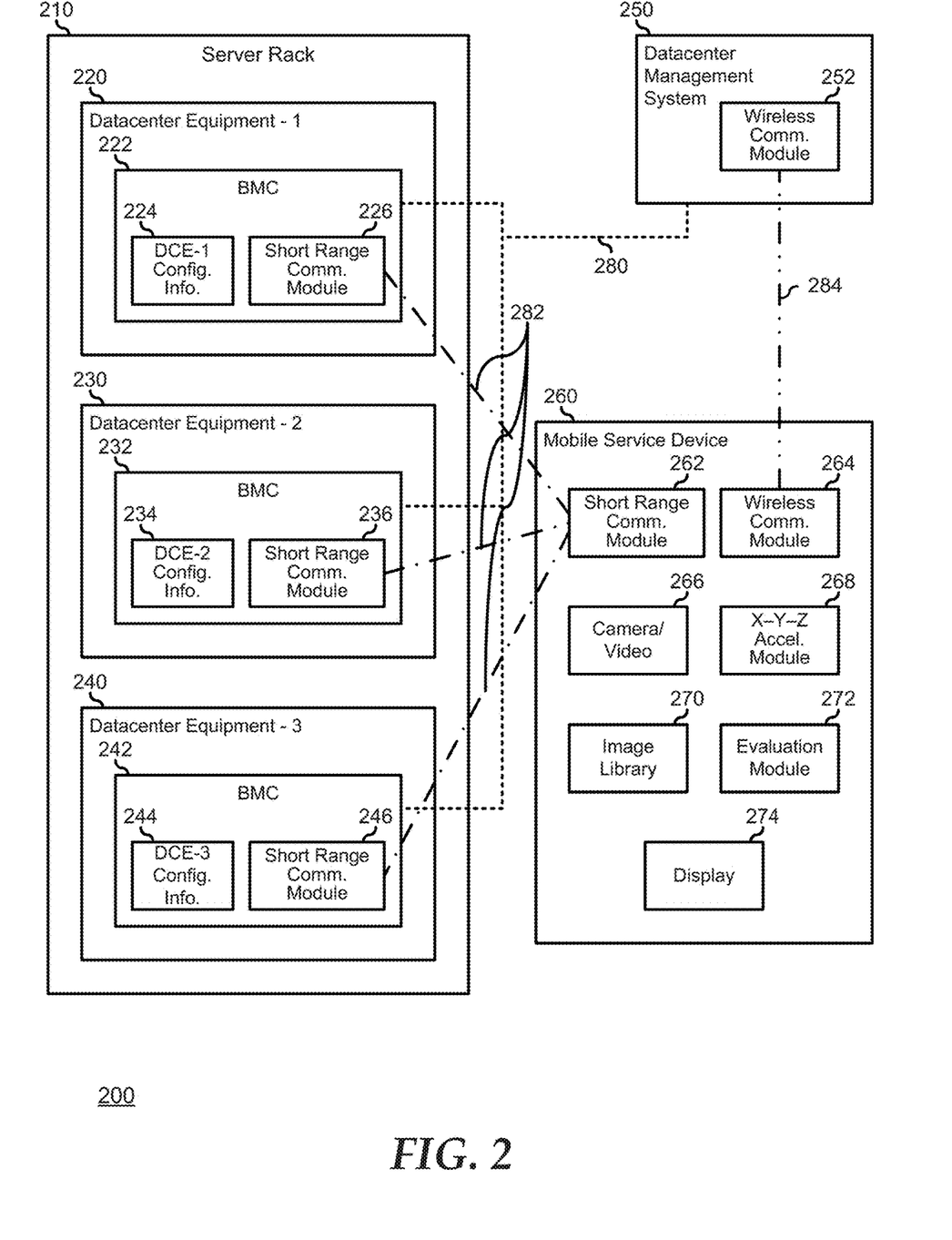
FIG. 2 is a block diagram of a datacenter according to an embodiment of the present disclosure.

FIG. 2 illustrates a portion of a datacenter 200 including a server rack 210, a datacenter management system 250, and a mobile service device 260. Server rack 210 includes datacenter equipment 220, 230, and 240. Datacenter equipment 220, 230, and 240 each represent various computing equipment, switching and routing equipment, data storage equipment, or other equipment of datacenter 200. For example, datacenter equipment 220 may represent a top-of-rack switch, datacenter equipment 230 may represent a blade server, and datacenter equipment 240 may represent a storage server. Datacenter equipment 220, 230, and 240 each include a hosted processing environment (not shown) that is configured to provide the processing tasks particular to the datacenter equipment. The particulars of integrating the processing tasks of datacenter equipment 220, 230, and 240 with each other to contribute to the overall processing tasks being performed by datacenter 200 are known in the art and will not be discussed further herein, except as needed to describe the teachings herein. Each of datacenter equipment 220, 230, and 240 includes a respective BMC 222, 232, and 242. BMCs 222, 232, and 242 each include a network interface device such that the BMCs are all connected together in a management network 280 with datacenter management system 250. Management network 280 may represent a wired network, a wireless network, or a combination of wired and wireless networks, as needed or desired.

BMC 222 includes configuration information 224 and a short-range communication module 226. Configuration information 224 represents management information utilized by datacenter management system 250 to monitor, manage, and maintain datacenter equipment 220. Configuration information 224 may represent physical information about the make, model, and hardware configuration of datacenter equipment 220, and may also represent information about the logical configuration of the datacenter equipment. For example, where datacenter equipment 220 represents a top-of-rack switch, configuration information 224 may include the make and model of the switch, a service tag, an associated switch fabric, a number of ports, and other physical information related to the switch, may include location information for the switch in server rack 210 and for the server rack in datacenter 200, may include information related to the health of the switch in terms of physical operational status and in terms of logical operational status such as error and alert status information, and may also include switch mappings, both physical and logical, port configurations, or other information that identifies the uses to which the switch is configured to perform. Near-filed communication module 226 represents a wireless communication endpoint that is capable of establishing a wireless communication link 282 to another similarly equipped device (here shown as a short-range communication module 262 of mobile service device 262). Short-range communication module 226 is configured to provide a very short connection range as compared with other wireless technologies, such as Wi-Fi or wireless cellular technologies. An example of short-range communication module 226 may include a communication endpoint in accordance with a BLUETOOTH standard, a BLUETOOTH Low Energy (BLE) standard, or another short-range communication standard, as needed or desired.

BMC 232 includes configuration information 234 and a short-range communication module 236. Configuration information 234 is similar to configuration information 224, representing management information utilized by datacenter management system 250 to monitor, manage, and maintain datacenter equipment 230. Thus configuration information 234 may represent physical information about datacenter equipment 230, and may also represent information about the logical configuration of the datacenter equipment. For example, where datacenter equipment 230 represents a blade server, configuration information 234 may include the make and model of the server, a service tag, a number of blades, and other physical information related to the server, may include location information for the blade server in server rack 210 and for the server rack in datacenter 200, may include information related to the health of the blade server in terms of physical operational status and in terms of logical operational status such as error and alert status information, and may also include information as to the installed operating systems, the workloads and processing tasks being performed on the blades, and other information that identifies the uses to which the server is configured to perform. Near-filed communication module 236 is similar to short-range communication module 226, and is capable of establishing a wireless communication link 282 to another similarly equipped device (again shown as short-range communication module 262).

BMC 242 includes configuration information 244 and a short-range communication module 246. Configuration information 244 is similar to configuration information 224 and 234, representing management information utilized by datacenter management system 250 to monitor, manage, and maintain datacenter equipment 240. Thus configuration information 244 may represent physical information about datacenter equipment 240, and may also represent information about the logical configuration of the datacenter equipment. For example, where datacenter equipment 240 represents a storage server, configuration information 244 may include the make and model of the server, a service tag, a number of storage drives and their capacities, and other physical information related to the server, may include location information for the server in server rack 210 and for the server rack in datacenter 200, may include information related to the health of the server in terms of physical operational status and in terms of logical operational status such as error and alert status information, and may also include information as to the physical, logical, and virtual drive configurations implemented on the storage drives, and other information that identifies the uses to which the server is configured to perform. Near-filed communication module 246 is similar to short-range communication modules 226 and 236, and is capable of establishing a wireless communication link 282 to another similarly equipped device (again shown as short-range communication module 262). It will be understood that, under various short-range communication standards, any particular short-range communication module 226, 236, 246, and 262 may only be able to establish a single wireless communication link to one other short-range communication module at a time. The methods for establishing wireless communication links between short-range communication modules, and for reestablishing different links to other modules is known in the art and will not be further described herein except as needed to describe the teachings herein. While the communication links between the datacenter equipment and mobile service device are illustrated as being wireless communication links, the communication links are not necessarily wireless communication links. In particular, embodiments where mobile service device 260 represents a computer system on a crash cart of a datacenter, it will be understood that the communication links between the mobile service device and the datacenter equipment may also represent wired communication links, such as via Ethernet, USB, or another wired communication fabric, as needed or desired.

Datacenter management system 250 represents a centralized and unified processing resource for monitoring, managing, and maintaining datacenter equipment 220, 230, and 240 through the datacenter management system's respective connections to BMCs 222, 232, and 242 via management network 280. Datacenter management system 250 includes a wireless communication module 252 that represents a wireless communication endpoint that is capable of establishing a wireless communication link 284 to another similarly equipped device (here shown as a wireless communication module 264 of mobile service device 262). Wireless communication module 252 is configured to provide a medium connection range as compared with other wireless technologies, such as wireless cellular technologies. An example of short-range communication module may include a communication endpoint in accordance with various IEEE 802.11 (Wi-Fi) standards, or another medium-range communication standard, as needed or desired.

Mobile service device 260 represents a device that may be utilized by datacenter technicians of the datacenter to perform monitoring, management, service, and maintenance of datacenter equipment 220, 230, and 240, and may represent a mobile device such as tablet computing devices, smart phone devices, and the like. Mobile service device 260 includes short-range communication module 262, wireless communication module 264, a camera/video system 266, an accelerometer module 268, an equipment image library 270, an augmented reality evaluation module 272, and a display 274. Short-range communication module 262 operates to establish communication links 282 with short-range communication modules 226, 236, and 246. It will be understood that under some short-range wireless communication standards, communication links 282 may represent only one point-to-point communication link for any particular one of short-range communication modules 226, 236, 246, and 264, such as where a particular BLUETOOTH or BLE endpoint only operates to create a single point-to-point communication link at a time. Methods for switching between such single point-to-point communication links are known in the art and will not be further discussed herein except as needed to describe the teachings herein. Wireless communication module 264 operates to establish communication link 284 with wireless communication module 252. Here, it will be understood that one, the other, or both of wireless communication modules 252 and 264 may represent an access point device that is capable of establishing multiple communication links similar to communication link 284, as needed or desired.

Camera/video system 266 represents an integrated device of mobile service device 260 that is configured to obtain still and motion-based images from the surroundings of the mobile service device. The field of view of camera/video system 266 may be restricted to a particular area in front of mobile service device 260. However, camera/video system 266 will be understood to include an ability to stitch together larger images that encompass a wider field of view than that of the camera/video system alone, by moving mobile service device 260 to bring additional image spaces into the field of view of the camera/video system. Methods and mechanisms for providing a camera/video system are known in the art and will not be further discussed herein except as needed to describe the teachings herein. Accelerometer module 268 represent an integrated device of mobile service device 260 that operates to track the motion of the mobile service device in three-dimensional space. Thus, from a particular location, accelerometer module 268 can determine a relative location to which mobile service device 260 has been moved based upon the accelerations which the mobile service device experiences. Accelerometer module 268 also includes an ability to locate the mobile service device within datacenter 200. For example, accelerometer module 268 may include a Global Positioning System (GPS) functionality to determine the location, or may include a triangulating functionality based upon the establishment of one or more communication links similar to communication link 284. Methods and mechanisms for providing an accelerometer module are known in the art and will not be further discussed herein except as needed to describe the teachings herein.

Image library 270 represents a structure of information that stores image objects that each represent various datacenter equipment such as server rack 210, and datacenter equipment 220, 230, and 240, along with other datacenter equipment that may be utilized in datacenter 200. In particular, the image objects in image library 270 can be provided by a manufacturer of datacenter equipment, where each image object is associated with a particular piece of datacenter equipment or a particular family of datacenter equipment. For example, where datacenter equipment 210 represents a specific type of top-of-rack switch manufactured by a particular manufacturer, image library 270 can include one or more image objects associated with top-of-rack switches and particularly, can include a specific image object associated with the specific type of top-of-rack switch. More specifically, the specific image object can represent in a primitive form the visible features of the specific type of top-of-rack switch. The image objects may also include other types of visibly distinguishing information such as QR-codes, bar codes, service tags, or other information that serves to visually identify storage racks and datacenter equipment, as needed or desired.

In addition to the image objects, image library 270 includes database information associated with each image object. The database information includes information about the specific type of datacenter equipment depicted by the associated image object. Thus, again where datacenter equipment 210 represents the specific type of top-of-rack switch, the associated database information can include the name, product code, SKU, or other information that identifies the specific type of top-of-rack switch, specification information about the specific type of top-of-rack switch such as a number of network ports, an associated switch fabric, speed and throughput information, or other information related to the specific type of top-of-rack switch, configuration information such as installed optional equipment and the like, or other information that may be utilized to identify the type of top-of-rack switch with more particularity, as needed or desired. In a particular embodiment, image library 270 is provided by the manufacturers of the various pieces of datacenter equipment and is routinely updated as new types of datacenter equipment is released. In general, the image objects and associated database information within image library 270 is available for comparison with the image data from the field of view of camera/video system 266 to assist evaluation module 272 to determine a location of mobile service device 260, as described further below.

It will be understood that a typical datacenter will include hundreds, if not thousands, of server racks similar to server rack 210, and that each server rack may include various datacenter equipment similar to datacenter equipment 220, 230, and 240. It will be further understood that some of the server racks may include a common set of datacenter equipment, such as by including a particular brand and model of top-of-rack switch in a top rack unit of the server rack, one or more of a particular brand and model of blade servers in lower rack units of the server rack, and a particular brand and model of storage server in a bottom rack unit of the server rack. Thus, a typical data center may include many rows of server racks that are visually indistinct from each other, or with only slight visual differences to distinguish between server racks. In addition, various models of a particular type of datacenter equipment may be visually identical or have only slight visual differences to distinguish between the models of that type of datacenter equipment. It will be further understood that, even where different server racks or the datacenter equipment therein look visually indistinct from each other, the data processing tasks being performed on each server rack will be different and unique from the data processing tasks being performed on the other server racks, but that such differences in the data processing tasks will give no visibly discernable clues as to which processing task is being performed on which server rack.

Augmented reality evaluation module 272 represents a processing function of mobile service device 260 that provides an augmented reality visual depiction of the surroundings of the mobile service device overlain on display 274. The augmented reality visual display is generated by evaluation module 272 based upon various inputs to mobile service device 260, including image data from camera/video system 266, location information from accelerometer module 268, configuration information from one or more of datacenter equipment 220, 230, and 240 via communication links 282, from datacenter management system 250 via communication link 284, or from other input information available to the mobile service device. In particular, evaluation module 272 operates to identify the datacenter equipment within server rack 210. Then, evaluation module 272 operates to present image information from camera/video system 268 on display 274, and the, having matched the correct image objects to the elements of server rack 210, to project an augmented reality overlay of the matched image objects onto their respective elements of the server rack. In addition to the projected image objects, evaluation module 272 displays associated identifying information in the projected image objects that identifies the various elements of the server rack.

Figure 3:
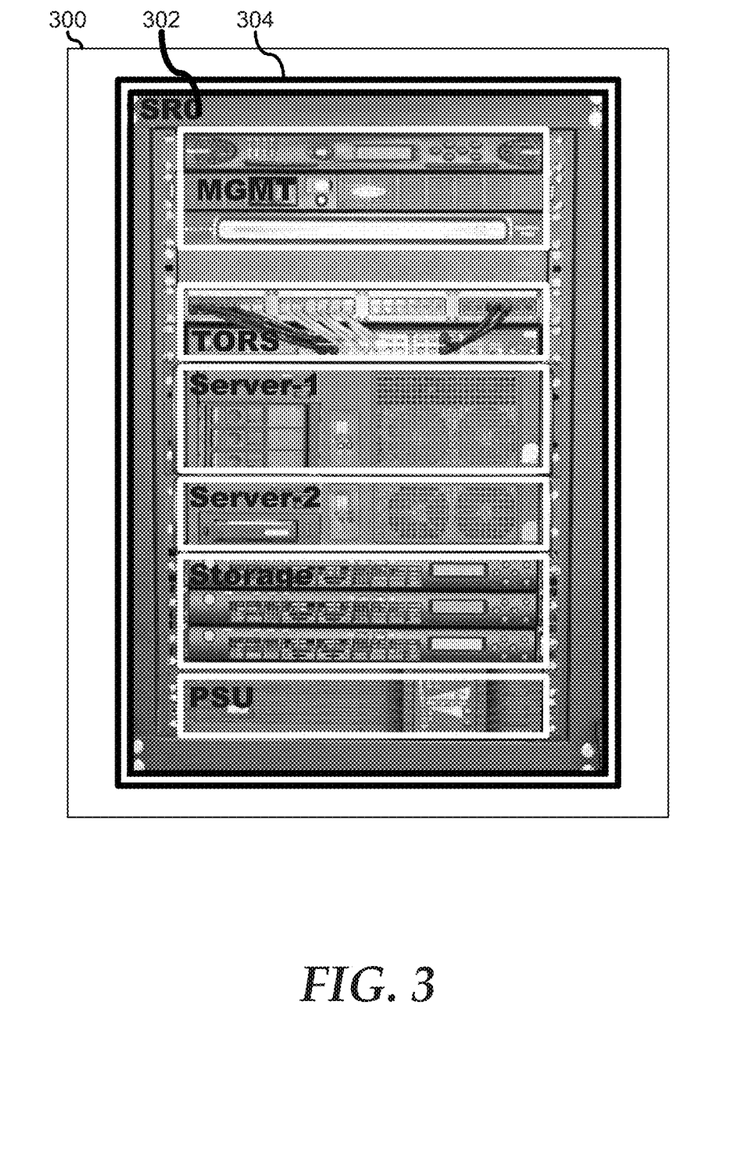
FIG. 3 is a screen capture of a display with an augmented reality overlay according to an embodiment of the present disclosure.

FIG. 3 illustrates an embodiment of a display 300 similar to display 274. Display 274 presents image information 302 from a camera/video system that show what is presently within the field of view of the camera/video system. Here, an evaluation module similar to evaluation module 272 operates to project an augmented reality overlay 304 onto screen 300. Note that augmented reality overlay 304 provides information that identifies the server rack and the elements within the server rack over image information 302. It will be understood that, as image information 302 changes, for example because the mobile service device is moved such that the field of view of the camera/video system changes, augmented reality overlay 304 will likewise change aspect to match the image information, including to identify new elements of the datacenter equipment that come within the field of view of the camera/video system. The mechanisms and methods for creating augmented reality overlays for display over image information are known in the art and will not be further disclosed herein, except as needed to illustrate the present embodiments. Thus, using available sensor data, such as location information, visual information, and configuration information available to a mobile service device, the present invention represents an improvement in the ability datacenter equipment to be reliably identified, in addition to the improvements derived from the use of augmented reality to depict to a datacenter technician the identities of the datacenter equipment in their vicinity.

In addition to identifying the elements within server rack 210, evaluation module 272 operates to create a datacenter management solution that provides a datacenter technician with a direct connection between datacenter management system 250, including the associated management information for datacenter 200, and datacenter equipment 230, 240, and 250. In this way, the datacenter technician views sensor data overlays for each of the datacenter equipment. For example, the sensor data overlays can include augmented reality overlays onto display 274 for system health, temperature, power, and performance, log information, support information, and other management information as the datacenter technician maintains the datacenter equipment. The support information may include a library of technical notes and best practices, videos, on-line based resources, and the like. In this way, in addition to improvements in the "at-the-box" support experience by the datacenter technician, the support activities are performed on the identified datacenter equipment, thereby reducing the errors from performing support tasks on a wrong element of datacenter equipment.

Figure 4:
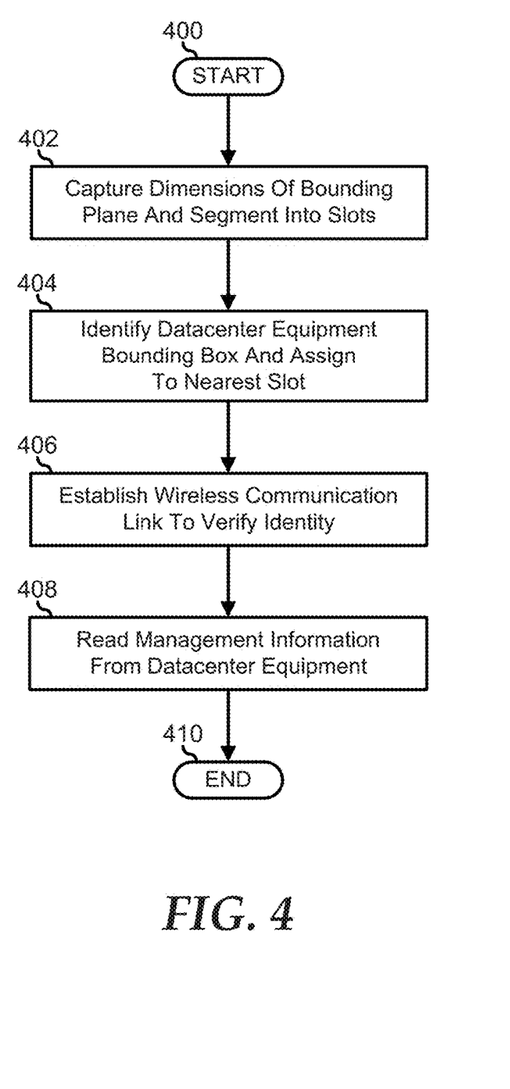
FIG. 4 is a flowchart illustrating a method for determining the identity of an element of datacenter equipment according to an embodiment of the present disclosure.

FIG. 4 illustrates a method for determining the identity of an element of datacenter equipment, starting at block 400. In block 402, a mobile service device measures a field of view of a camera/video system to identify regions that correlate to slots in a server rack. Here, the mobile service device may be sufficient to measure dimensions of the server rack and the slots with an accuracy margin of less than one percent (1%). Thus, where a particular server rack may have a height of 78 inches, the mobile service device can expect an accuracy margin of less than 0.8 inch. Thus, where a slot of a server rack is typically 1.75 inches, the mobile service device may be expected to be able to resolve all rack slots such that any recognized point in the field of view would fall within a locus. Further, whichever portion of the locus most overlaps with a measured, segmented space within the field of view would be reasonably considered as the fixed point of the slot. Here, the mobile service device segments the server rack into regions of 1.75 inch high slots, and the regions are utilized for further image recognition tasks as described below.

In block 404, image recognition is performed on the visual space to identify datacenter equipment within a server rack. Here, using image recognition, an evaluation module operates to understand bounding regions within a field of view of camera/video system. In particular, a geometry is assigned which is parsed and mathematically operated upon to map to the field of view of the camera/video system. Then an image object that matches the datacenter equipment is identified that narrows down the possible identities of the datacenter equipment to one of a few number of image objects. In another embodiment, an image object is selected based upon a known identifier for the datacenter equipment, such as an asset tag or other identifier for the datacenter equipment.

Once the bounding region of the datacenter equipment has been identified by the evaluation module, an appropriate point is chosen to measure against the segmented field of view. In this way, the evaluation module assigns the visual identity of the datacenter equipment in each slot to recognized image objects. For example, the field of view of a particular server rack can be parsed and segmented into 42 slots. Here, where the server rack has three elements of datacenter equipment that are located in slots 21, 22, and 23, the evaluation module can activate image recognition on the field of view to attempt to matching image objects. Then the evaluation module can position geometries within the field of view and centered to the nearest slot, thereby locating three elements of datacenter equipment at slots 21, 22, and 23.

In block 406, a wireless communication link is established between the mobile service device and the datacenter equipment to confirm the identity of the datacenter equipment. In a particular embodiment, the evaluation module sends indication information to the datacenter equipment, and the datacenter equipment responds by providing a visible indication associated with the indication information and which is detected in the field of view to establish the location of the datacenter equipment. Here, the image recognition correlations and the wireless communication links are combined to establish greater confidence in the identity of the datacenter equipment. It will be understood that due to the nature of wireless communication links, the evaluation module may detect multiple unidentified wireless communication beacons. Here, the evaluation module needs to assign a particular identity for each element of datacenter equipment.

Figure 5:
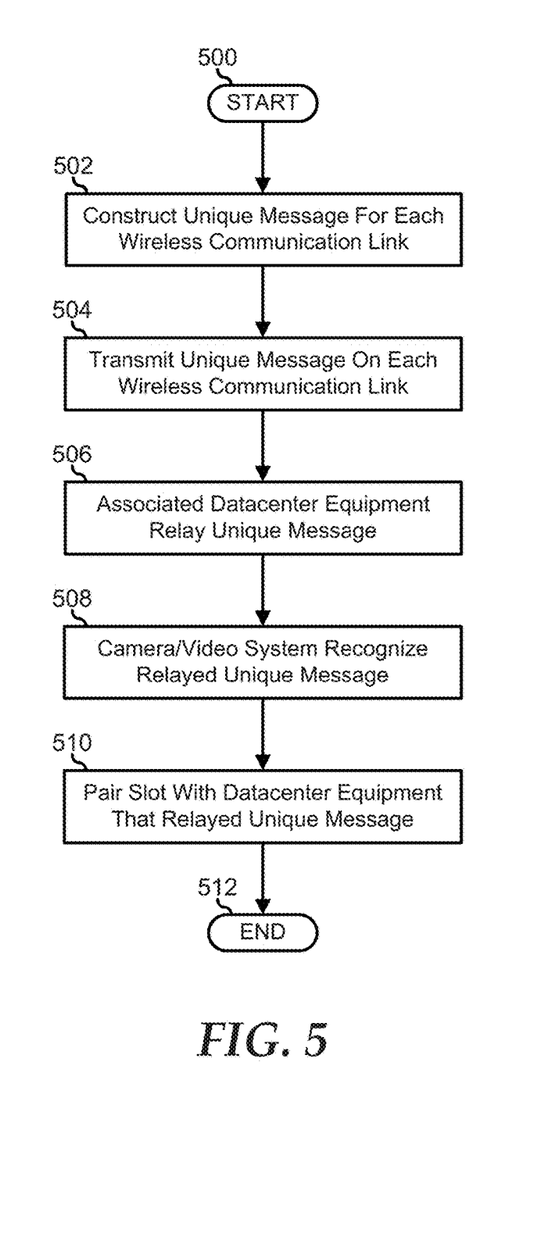
FIG. 5 is a flowchart illustrating a method for pairing elements of datacenter equipment with their associated slots in a server rack according to an embodiment of the present disclosure.

FIG. 5 illustrates a method for pairing elements of datacenter equipment with their associated slots in a server rack, starting at block 500. At block 502, in order to establish full confidence in the identity of a recognized element of datacenter equipment, the evaluation module constructs unique messages to send in response to each wireless communication beacon detected. The messages are selected to be unique enough to identify the elements of datacenter equipment with sufficient confidence to eliminate the other wireless connection beacons. For example, if eight wireless connection beacons are detected, the evaluation module can create eight messages with at least three bits of information. In block 504, the mobile service device transmits a unique message to each element of datacenter equipment vie the respective wireless communication links. In block 506, after each element of datacenter equipment receives the message, the datacenter equipment visually relays the message back to the mobile service device. For example, the datacenter equipment may include an identification light and the message can represent a blink pattern for the datacenter equipment. Then each element of datacenter equipment can flash the identification light in the received blink pattern. In another example, the datacenter equipment may include a display device. Then each element of datacenter equipment can display a code or pattern associated with the received message. In block 508, the camera/video system receives the displayed message from the elements of datacenter equipment. In block 510, the evaluation module utilizes the image recognition to detect the message and, by analysis of the boundary where the recognition of the message was detected, links the message and the corresponding identifier to the visually detected datacenter equipment, and the method ends in block 512. Returning to FIG. 4, in block 408, the mobile service device receives management information from the elements of datacenter equipment via the respective wireless communication links and via a management network with a datacenter management system, and the method ends at block 410.

Figure 6:
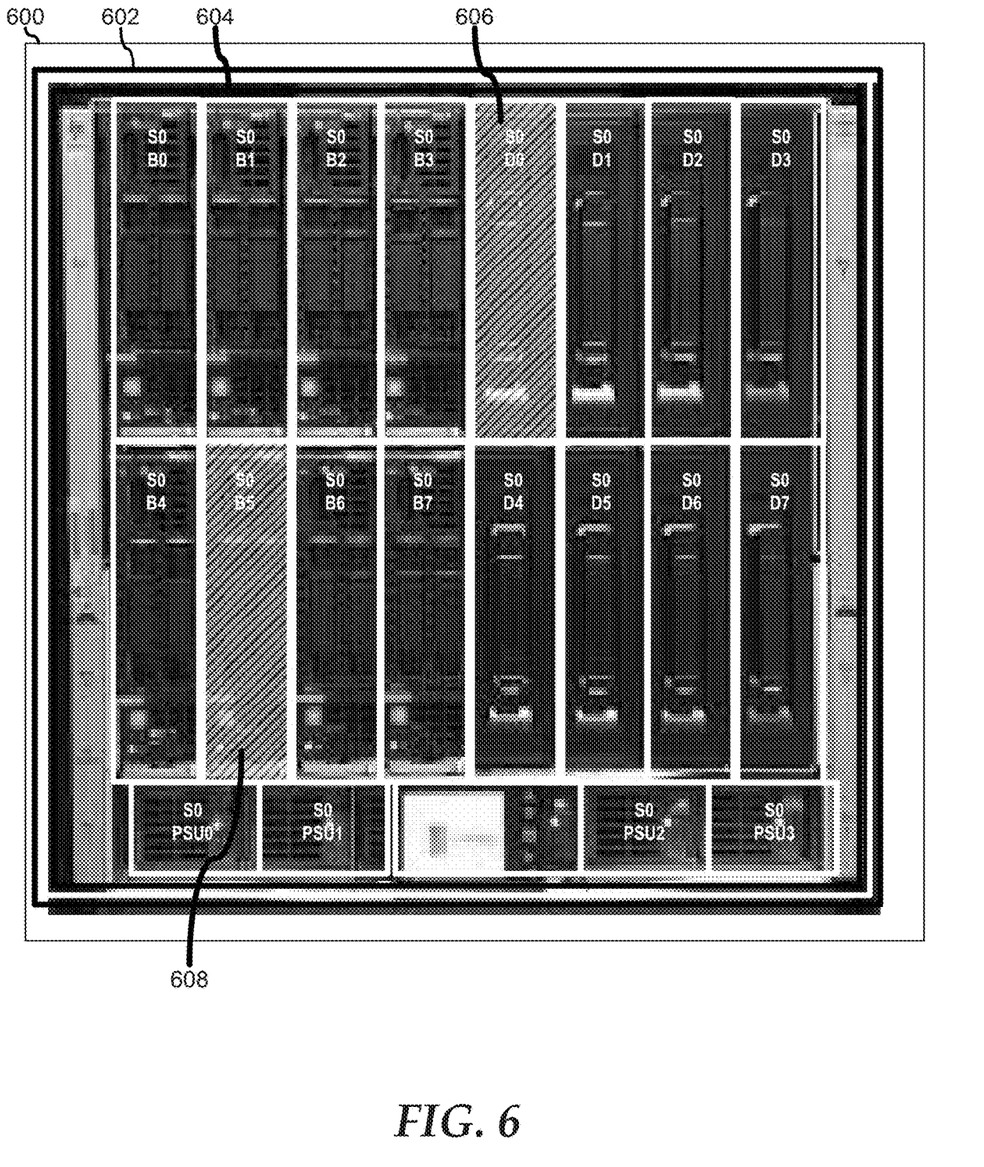
FIGS. 6-8 are screen captures of a display with an augmented reality overlay according to an embodiment of the present disclosure.
Figure 7:
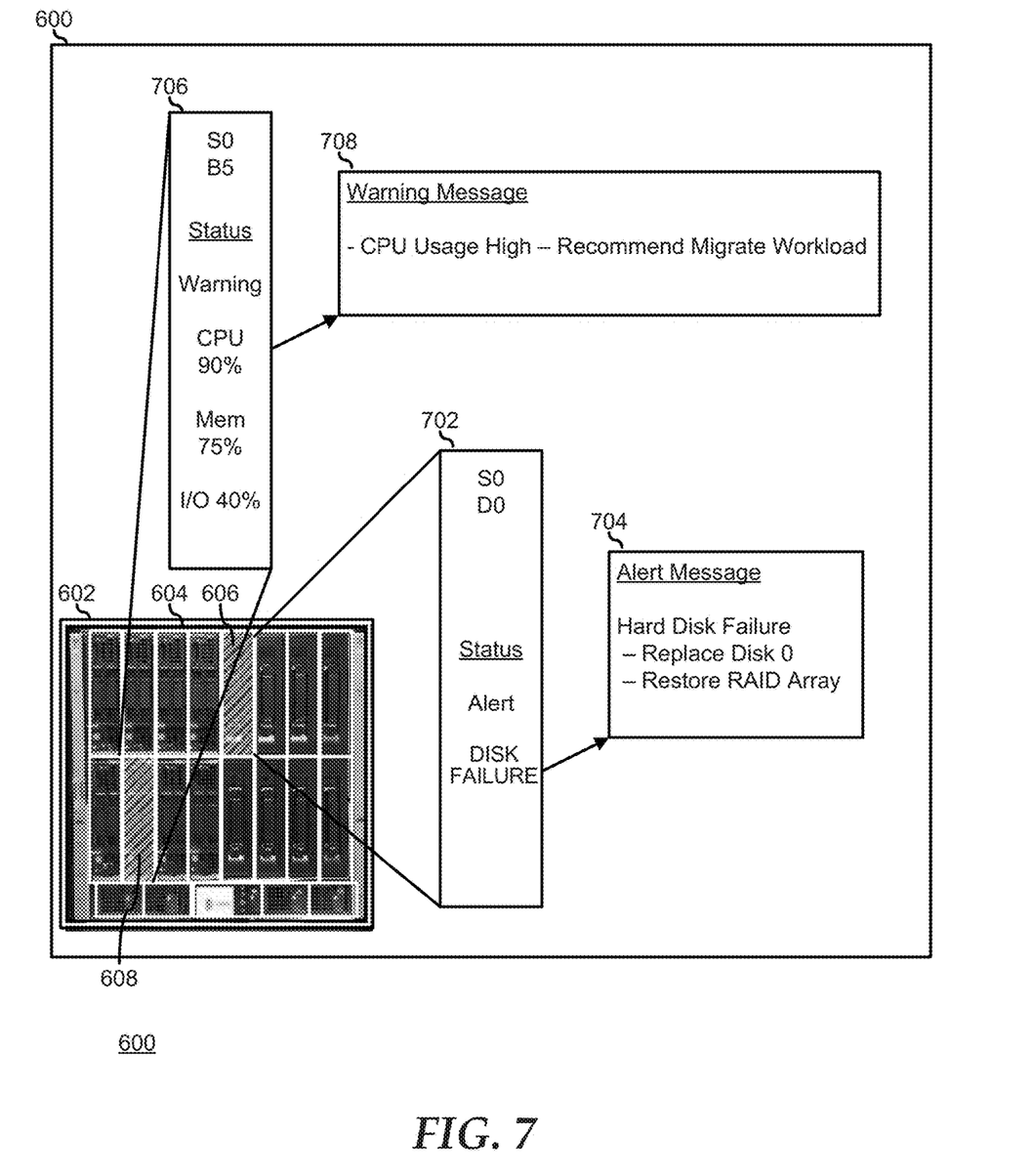

FIGS. 6 and 7 illustrate an embodiment of a display 600 similar to displays 274 and 300. Display 600 presents image information 602 from a camera/video system that show what is presently within the field of view of the camera/video system. Here, an evaluation module similar to evaluation module 272 operates to project an augmented reality overlay 604 onto screen 600. Note that augmented reality overlay 604 provides information that identifies an element of datacenter equipment, here a blade server, and the individual modules that make up the datacenter equipment, here server blades 0-7, disk drives 0-7, and power supplies 0-3. Augmented reality overlay 604 further shows two modules 606 and 608 as being highlighted, disk drive 0 and server blade 5. Here, the evaluation module operates to receive not only identification and location information for the datacenter elements within the field of view of a camera/video system, but also communicates with the datacenter equipment and a datacenter management system to receive configuration information related to the datacenter equipment. The type of configuration information that is displayed on augmented reality overlay 604 can vary based upon a selection by a datacenter technician of one or more types of configuration information that is desired to be displayed. For example, while the evaluation module can have protected access to various levels of management information for the datacenter equipment, the datacenter technician may select between different types of management information to be displayed by augmented reality overlay 604. Types of management information may include health information for the modules of the datacenter equipment such as hardware status, processor, memory, storage, or I/O utilization levels, and the like, environmental information such as temperature information, fan speed and fan efficiency information, or other environmental information, module of datacenter equipment configuration settings such as may be accessed via a BIOS setup mode, network connectivity information including physical and virtual network connectivity and the like, logical information such as virtual machine status, workload information and status, and the like. Here, the evaluation module can provide selection options on display 600 and the datacenter technician may interact with the selection options to obtain different management information from augmented reality overlay 600. Further, the datacenter technician can interact with augmented reality overlay 600 to expand selected elements of the augmented reality overlay to get additional information for the selected elements. For example, by selecting module 606, the datacenter technician can expand the view 702 and get further information 704 on module 606, or by selecting module 608, the datacenter technician can expand the view 706 to get further information 708 on module 608.

In a particular embodiment, a mobile service device operates to provide configuration information to elements of datacenter equipment via their respective wireless communication links. In this way, the mobile service device can be used to configure a datacenter for creation of groups and clusters of servers, storage element assignment, template assignment, network assignment, or the like. In particular, an evaluation module operates to gather configuration information from a number of related elements of datacenter equipment, such as membership in multi-chassis management groups, peers in a stack, attributes of each chassis, components within each chassis, or the like. The evaluation module then determines locations of other elements of datacenter equipment within the datacenter that are related to the datacenter equipment that is in the of view, and overlays the locations on an augmented reality overlay to show which elements are in a common grouping. Then the evaluation module operates to provide options to add or delete datacenter equipment from the groupings. In another embodiment, the augmented reality overlay operates to provide options for modifying the configuration information from one or more elements of datacenter equipment and returns the modified configuration information to the elements to implement the modifications as provided by the mobile service device. For example, a mobile service device may include programs or APIs for modifying the configuration of the elements of datacenter equipment, as needed or desired.

In another embodiment, a mobile service device similar to mobile service device 260 operates to provide an augmented support solution that allows a remote technician to view datacenter equipment as seen by a datacenter technician, and permits the remote technician to guide the datacenter technician through various remediation and maintenance tasks for the datacenter equipment. Here, when a datacenter management system becomes aware of an element of datacenter equipment that is in need of service or repair, the datacenter management system communicates the issue to a mobile service device, identifying the particular element and its location in the datacenter. The datacenter technician goes to the location using the location features as described above, and the evaluation module of the mobile service device provides an augmented reality overlay on the display of the mobile service device to identify the problem element.

Figure 8:
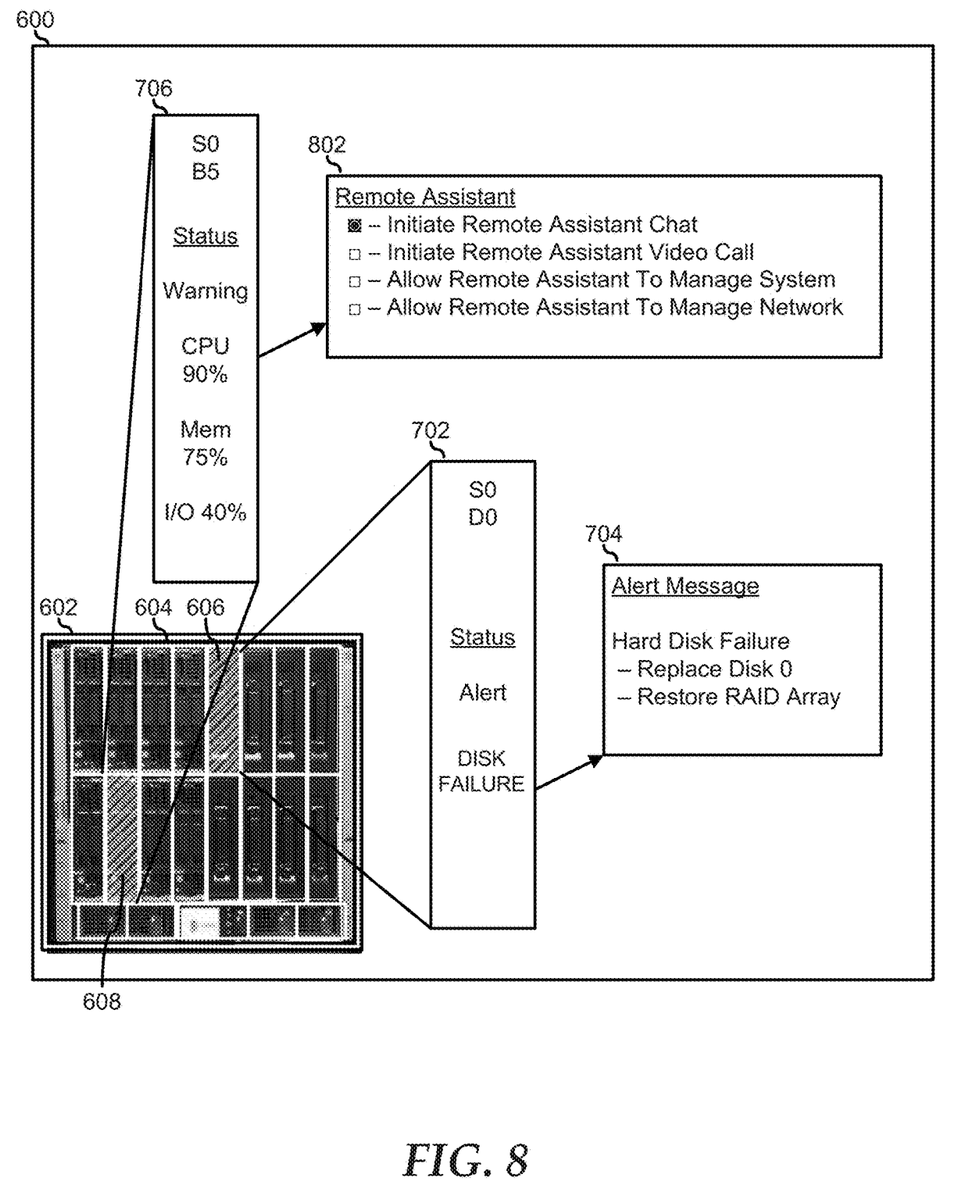

FIG. 8 illustrates display 600 where the information 708 for module 608 is replaced with a remote assistance block 802 that provides for a selectable connection with a remote technician. Here, the mobile service device can include various APIs and programs that permit various levels of connectivity with a remote technician. Here, the datacenter technician selects between various interaction levels, such as a chat or video call interface, levels for remote control over the mobile service device or the element of datacenter equipment, or other interaction types or control levels, as needed or desired. For example, the mobile service device can utilize a web browser to establish a secure session with the remote technician, such as via a secure web site or the like. The secure session may include other levels of security access as are known in the art, and such security methods and procedures will not be further disclosed herein except as needed to describe the embodiments herein.

Once the remote session is established between the mobile service device and the remote technician, the remote service technician provides instructions and assistance as needed to perform the needed remediation and maintenance tasks for the datacenter equipment. In this way, the mobile service device functions as a secure proxy between the management information and control associated with the management network and the remote technician. Then, while the datacenter technician is performing the remediation and maintenance tasks for the datacenter equipment, the remote technician views the activities of the datacenter technician via the camera/video system and can provide on-the-spot instructions or correction, as needed or desired. In addition, the remote technician can provide videos or other instructional information for downloading onto the mobile service device. In a particular embodiment, a remote service system operates to interact with the augmented reality overlay to show, within the field of view of the camera/video system, the steps to take to perform the remediation and maintenance tasks.

In a particular embodiment, the remote technician accesses various APIs to perform the remediation and maintenance tasks, using the mobile service device as a secure proxy. Here, the APIs may be located on a system at the remote technician's location, on the mobile service device, or on the datacenter equipment, as needed or desired. Here further, the datacenter technician may be called upon to review and approve any changes made to the datacenter equipment by the remote technician, as needed or desired.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system for managing equipment in a datacenter, the information handling system comprising:
 a display;
 a first wireless communication interface;
 a second wireless communication interface; and
 an imaging system configured to capture image data from within a field of view of the imaging system;
 wherein the information handling system is configured to:
  establish a first wireless communication link with a remote service system via the first wireless communication interface;
  show the image data on the display;

provide an augmented reality overlay on the display over the image data, wherein the augmented reality overlay locates an element of datacenter equipment that needs to be serviced;
determine that the element is within the field of view;
establish a second wireless communication link with the element via the second wireless communication interface in response to determining that the element is within the field of view;
provide the image data and the augmented reality overlay to the remote service system via the first wireless communication link;
receive first configuration information from the element via the first wireless communication link, wherein the first configuration information includes health information for the element, environmental information for the element, and configuration settings for the element;
receive an instruction to service the element based upon the first configuration information from the remote service system in response to providing the augmented reality overlay to the remote service system;
determine that the image data indicates that a service technician has attempted to implement the instruction; and
receive a correction to the instruction from the remote service system in response to determining that the service technician has attempted to implement the instruction.

2. The information handling system of claim 1, wherein, after establishing the first wireless communication link, the information handling system is further configured to:
provide a dialog box on the augmented reality overlay, the dialog box providing a plurality of options for contacting the remote service system.

3. The information handling system of claim 2, further configured to:
receive a selection of a particular option; and
establish a secure session with the remote service system in response to receiving the selection.

4. The information handling system of claim 3, wherein receiving the instruction is in response to establishing the secure session.

5. The information handling system of claim 3, wherein the plurality of options includes a chat request, a video call request, and a remote management request.

6. The information handling system of claim 1, further configured to:
provide an indication to the remote service system to manage the element, wherein receiving the instruction is in response to providing the indication.

7. The information handling system of claim 6, further configured to:
provide second configuration information to the element in response to receiving the instruction.

8. A method comprising:
establishing a first wireless communication link between an information handling system and a remote service system via a first wireless communication interface of the information handling system;
showing image data from an imaging system of the information handling system on a display of the information handling system;
providing an augmented reality overlay on the display over the image data, wherein the augmented reality overlay locates an element of datacenter equipment that needs to be serviced;
determining that the element is within a field of view of the imaging system;
establishing a second wireless communication link with the element via a second wireless communication interface of the information handling system in response to determining that the element is within the field of view;
providing the image data and the augmented reality overlay to the remote service system via the first wireless communication link;
receiving first configuration information from the element via the first wireless communication link, wherein the first configuration information includes health information for the element, environmental information for the element, and configuration settings for the element;
receiving an instruction to service the element based upon the first configuration information from a remote service system in response to providing the augmented reality overlay to the remote service system;
determining that the image data indicates that a service technician has attempted to implement the instruction; and
receiving a correction to the instruction from the remote service system in response to determining that the service technician has attempted to implement the instruction.

9. The method of claim 8, wherein, after establishing the first wireless communication link, the method further comprises:
providing a dialog box on the augmented reality overlay, the dialog box providing a plurality of options for contacting the remote service system.

10. The method of claim 9, further comprising:
receiving a selection of a particular option; and
establishing a secure session with the remote service system in response to receiving the selection.

11. The method of claim 10, wherein receiving the instruction is in response to establishing the secure session.

12. The method of claim 10, wherein the plurality of options includes a chat request, a video call request, and a remote management request.

13. The method of claim 8, further comprising:
providing an indication to the remote service system to manage the element, wherein receiving the instruction is in response to providing the indication.

14. The method of claim 13, further comprising:
providing second configuration information to the element in response to receiving the instruction.

15. An information handling system comprising:
a first element of datacenter equipment including a first wireless communication interface; and
a mobile service device including:
a display;
a second wireless communication interface;
a third wireless communication interface; and
an imaging system configured to capture image data from within its field of view;
wherein the mobile service device is configured to:
establish a first wireless communication link with a remote service system via the second wireless communication interface;
show the image data on the display;
provide an augmented reality overlay on the display over the image data, wherein the augmented reality overlay locates an element of datacenter equipment that needs to be serviced;
determine that the element is within the field of view;

establish a second wireless communication link with the element via the third wireless communication interface in response to determining that the element is within the field of view;

receive first configuration information from the element via the first wireless communication link, wherein the first configuration information includes health information for the element, environmental information for the element, and configuration settings for the element;

receive an instruction to service the element based upon the first configuration information from a remote service system in response to providing the augmented reality overlay to the remote service system;

determine that the image data indicates that a service technician has attempted to implement the instruction; and receive a correction to the instruction from the remote service system in response to determining that the service technician has attempted to implement the instruction.

16. The information handling system of claim 15, wherein, after establishing the first wireless communication link, the mobile service device further configured to:

provide a dialog box on the augmented reality overlay, the dialog box providing a plurality of options for contacting the remote service system.

17. The information handling system of claim 16, the mobile service device further configured to:

receive a selection of a particular option; and establish a secure session with the remote service system in response to receiving the selection.

18. The information handling system of claim 17, wherein receiving the instruction is in response to establishing the secure session.

19. The information handling system of claim 16, wherein the plurality of options includes a chat request, a video call request, and a remote management request.

20. The information handling system of claim 15, the mobile service device further configured to:

provide an indication to the remote service system to manage the element, wherein receiving the instruction is in response to providing the indication; and provide second configuration information to the element in response to receiving the instruction.

\* \* \* \* \*